(12) United States Patent
Marena

(10) Patent No.: US 6,257,280 B1
(45) Date of Patent: *Jul. 10, 2001

(54) COMPOSITE HOSE ASSEMBLY

(75) Inventor: Alfonso Marena, Wethersfield, CT (US)

(73) Assignee: Teleflex Fluid Systems, Suffield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/198,814

(22) Filed: Nov. 24, 1998

Related U.S. Application Data

(60) Continuation-in-part of application No. 08/791,855, filed on Jan. 27, 1997, now Pat. No. 5,974,649, which is a division of application No. 08/461,703, filed on Jun. 5, 1995, now Pat. No. 5,655,572.

(51) Int. Cl.$^7$ .............................. F16L 11/08; B23P 25/00
(52) U.S. Cl. ........................ 138/125; 138/127; 138/137; 138/146; 138/153; 264/103; 264/249; 29/458
(58) Field of Search ..................................... 138/109, 123, 138/124, 125, 146, 153, DIG. 3, 127, 137, 145; 264/103, 127, 135, 136, 137, 249; 156/149, 244.13; 29/458, 460, 890.144

(56) References Cited

U.S. PATENT DOCUMENTS

| | | | |
|---|---|---|---|
| 2,787,289 | * 4/1957 | Press | 138/DIG. 3 |
| 3,334,165 | * 8/1967 | Koch . | |
| 3,463,197 | * 8/1969 | Slade . | |
| 3,750,712 | * 8/1973 | Brand | 138/125 |
| 3,857,415 | * 12/1974 | Morin et al. | 138/122 |
| 4,111,237 | * 9/1978 | Mutzner et al. | 138/125 |
| 4,259,989 | * 4/1981 | Lalikos et al. | 138/127 |
| 4,273,160 | * 6/1981 | Lowles | 138/125 |
| 4,345,624 | * 8/1982 | Rider | 138/127 |
| 4,347,090 | * 8/1982 | Anderson et al. | 138/125 |
| 4,357,962 | * 11/1982 | Shaw et al. | 138/125 |
| 4,384,595 | * 5/1983 | Washkewicz et al. | 138/127 |
| 4,754,685 | * 7/1988 | Kite et al. | 138/123 |
| 4,801,501 | * 1/1989 | Harlow | 428/383 |
| 4,954,388 | * 9/1990 | Mallouk et al. | 428/198 |
| 5,124,878 | * 6/1992 | Martucci | 138/DIG. 3 |
| 5,142,782 | * 9/1992 | Martucci | 138/125 |
| 5,170,011 | * 12/1992 | Martucci | 138/137 |
| 5,192,476 | * 3/1993 | Green | 264/127 |
| 5,216,079 | * 6/1993 | Crosby et al. | 525/146 |
| 5,381,834 | * 1/1995 | King | 138/125 |
| 5,430,603 | * 7/1995 | Albino et al. | 138/125 |
| 5,655,572 | * 8/1997 | Marena | 138/127 |
| 5,974,649 | * 11/1999 | Marena | 29/458 |

* cited by examiner

Primary Examiner—James Hook
(74) Attorney, Agent, or Firm—Kohn & Associates

(57) ABSTRACT

A lightweight hose assembly (10) of the type adapted for conveying fuels, halogens, and other volatile corrosive fluids is disclosed. The assembly (10) includes a tubular inner liner (12) including a polymeric fluorocarbon material resistant to chemical and heat degradation. A reinforcing layer (14) having gaps extending therethrough is disposed about the inner liner (12). The assembly (10) further includes an outer fluoropolymer coating (16) dispersed throughout the reinforcing layer (14). The hose assembly (10) is characterized by including at least one polymeric fluorocarbon reinforcing layer (18) disposed about the reinforcing layer (14) for increasing strength and flexibility while providing assistance to chemical build-up and degradation to the hose assembly (10). A method of making the hose assembly (10) includes the step of extruding the inner liner (12), applying a dispersion including a fluorocarbon polymer material and a carrier fluid over the inner liner (12), disposing a first braided reinforcing layer (14) about the inner liner (12) and over the applied dispersion, applying a second dispersion including a fluorocarbon polymer material in a carrier fluid over the reinforcing layer (14) to chemically bond the reinforcing layer (14) to the inner layer (12) and the first applied dispersion. At least one polymeric fluorocarbon braided reinforcing layer (18) is then applied about the first braided reinforcing layer (14).

27 Claims, 1 Drawing Sheet

COMPOSITE HOSE ASSEMBLY

CROSSREFERENCE TO RELATED APPLICATIONS

This application is a continuation-in-part of U.S. Ser. No. 08/791,855, filed Jan. 27, 1997, now U.S. Pat. No. 5,974,649 which is divisional of U.S. Ser. No. 08/461,703, filed Jun. 5, 1995, now U.S. Pat. No. 5,655,572, issued Aug. 12, 1997.

TECHNICAL FIELD

The subject invention relates a hose construction. More specifically, the subject invention relates to a hose assembly having improved strength and flexibility, improved resistance to chemical build-up and degradation and reduced effusion characteristics.

BACKGROUND OF THE INVENTION

Hose assemblies for conveying fuel and other volatile corrosive materials, such as liquified halogen gases are well known in the art. Such assemblies are exposed to a variety of fuel mixtures, fuel additives, and caustic or corrosive materials in addition to being exposed to extreme temperatures and pressures. Thus, such hose assemblies must be resistant to chemical, environmental, and physical degradation as a result of chemical exposure, environmental exposure to heat, and physical degradation resulting from bending and repeated movement or forces applied to the assembly.

Polymeric fluorocarbon materials such as polytetrafluorethylene possess the requisite chemical and temperature resistant properties for most fuel hose applications. Unfortunately, however, polymeric fluorocarbon materials exhibit relatively more poor tensile and hoop strengths. As a consequence, such fluorinated materials are prone to kinking. Such kinking remains permanent and provides a continual resistance to fluid flow through the hose assembly. Moreover, as a result of a fluorinated material's low tensile strength, attachment of securing or coupling members to the hose assembly is substantially compromised.

Various approaches have been described for offering additional strength to a polymeric fluorocarbon liner. One approach involves braiding fibers about the inner fluorocarbon liner. The braided fibers offer additional strength to the fluorocarbon liner resulting in a hose assembly that resists kinking. In the example of such an approach is disclosed in U.S. Pat. No. 5,124,878, filed Jul. 12, 1991, and assigned to the assignee of the subject invention. The hose assembly described in the '878 patent includes an inner fluorocarbon polymeric liner, a braided reinforcing layer disposed about the exterior of the inner liner, and is characterized by including an organic polymeric material dispersed in the reinforcing layer which connects the reinforcing layer to the inner liner thereby providing a hose assembly which is stronger and more kink resistant.

An additional example for strengthening an inner fluorocarbon liner with an outer liner while also increasing flexibility is shown in U.S. Pat. No. 3,023,787 to Phillips et al. The Phillips et al. patent discloses a convoluted hose assembly having a fluorocarbon inner liner constructed of many layers of helically wrapped Teflon® tape. Convoluted hoses are typically employed because they provide flexibility to a fluorocarbon hose assembly, however, convoluted hose assemblies have inherent weaknesses. A reinforcing strip consisting of reinforcing fibers coated with a plastic material is wrapped about the inner layer to provide additional strength to the assembly due to the inherent weakness of wrapped convoluted core construction. In its final assembly, a metal braid is applied to the outside of the hose assembly to impart greater strength. Hose assemblies of the type described in the Phillips et al. patent have several inherent drawbacks. First, because the inner liner is formed by helically wrapping layers of a fluorocarbon tape, it requires a greater amount of fluorocarbon material to be utilized in order to construct the inner liner which adds to both the cost of constructing the hose assembly and to the labor intensity of constructing the hose assembly. The most prominent drawback associated with hoses of the type disclosed in the Phillips et al. patent includes failure of seams created by helically wrapping layers of Teflon® tape. These failures occur due to inherent weaknesses in bonding the seams created by the overlapping layers of tape which, under internal pressures and prolonged movement are prone to leakage. Furthermore, due to the continuous seam which is created during core wrapping, wrapped or convoluted core hoses are highly prone to effusion of molecules from the interior of the hose to the exterior environment. This inherent location for molecular effusion of the contents of the wrapped core hose assembly allows for the rapid escape or release of potentially toxic, caustic, and environmentally harmful materials from the hose assembly. Effusion is defined as the movement of gas molecules through small holes. Again, due to the nature of convoluted or wrapped hose construction, materials are more likely to effuse from a prior art hose assembly even when the hose assembly is intact and not damaged or worn due to extended use. In addition, the seams create undulations within the inner liner which cause disruption in the flow of liquids therein which could give rise to increased electrical charge buildup within the hose.

Additionally, prior art hose assemblies utilized for conducting corrosive or hazardous substances are inherently prone to chemical degradation due to spillage of the corrosive or hazardous material on the exterior of the hose assembly or from the build-up or pooling of effused corrosive or hazardous material on the exterior of the hose assembly. The problem of spillage or pooling of effuent on the exterior of the hose assembly can cause localized degradation of the hose assembly due to acid formation in the case of halogen spillage or effuent. The localized degradation can cause premature failure of the hose assembly. Additionally, the proneness of prior art hose assemblies to chemical degradation from spillage or effuent pooling is especially problematic in hose assemblies which utilize a metallic or non-chemical resistant outer layers or jackets in order to provide strength and flexibility to the hose assembly. Metallic or non-chemical resistant outer layers or jackets are especially prone to degradation from acid formation or corrosive materials which may be spilled or effuse from the interior of the hose assembly and pool on the exterior of the hose assembly.

Therefore, it would be desirable to have a hose assembly which includes an extruded polymeric fluorocarbon inner liner which is resistant to effusion of molecules from within the hose assembly while additionally possessing an outer layer which is resistant chemical degradation while also increasing flexibility and reducing kinking of the inner liner.

SUMMARY OF THE INVENTION AND ADVANTAGES

In accordance with the present invention, there is provided a hose assembly including an extruded smooth bore tubular inner liner, a reinforcing layer having gaps extending therethrough disposed about the inner liner, an intermediate coating including a fluorocarbon polymeric material dispersed in the reinforcing layer for strengthening and connecting the reinforcing layer to the inner liner. The hose assembly is characterized by at least one polymeric fluorocarbon reinforcing layer disposed about the first reinforcing layer which is resistant to chemical degradation while also increasing flexibility and reducing kinking of the inner liner.

Additionally, according to the present invention, a method for constructing a hose assembly is also provided. The method includes the steps of extruding a polymeric fluorocarbon inner liner, applying a polymeric fluorocarbon dispersion over the inner liner, disposing a first braided reinforcing layer about the tubular inner liner and over the first applied dispersion. A second polymeric fluorocarbon dispersion is then applied over the reinforcing layer to chemically bond the reinforcing layer to the inner liner in the first applied dispersion. The method is characterized by the step of disposing at least one polymeric fluorocarbon braided reinforcing layer about the first braided reinforcing layer thereby providing a hose assembly which is resistant to chemical degradation and has improved flexibility and kink resistance.

Accordingly, the present invention provides a hose assembly including a polymeric fluorocarbon inner liner having chemical and heat resistant properties and at least one polymeric fluorocarbon reinforcing layer providing resistance to chemical degradation while also providing support and strength to the inner liner thereby increasing the hose assembly's flexibility and resistance to kinking.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
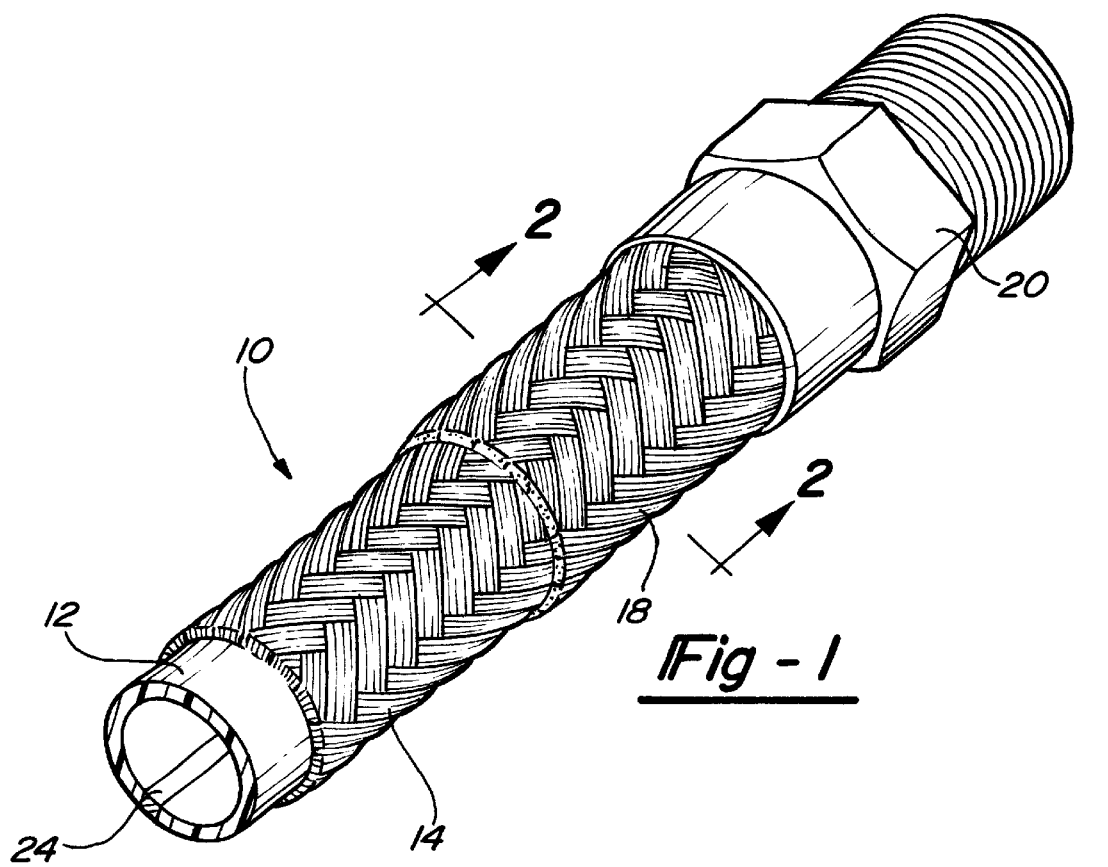
FIG. 1 is a perspective view of partially broken away and in cross-section of the preferred embodiment of the subject invention.

A hose assembly made in accordance with the present invention is generally shown at 10 in FIG. 1. The assembly 10 includes a tubular inner liner 12, a reinforcing layer 12, an intermediate coating dispersed in the reinforcing layer 14 and at least one polymeric fluorocarbon reinforcing layer 18 disposed about the intermediate reinforcing layer 14. A coupling means 20 adapted to engage the ends of the hose assembly 10 may be included.

Figure 2:
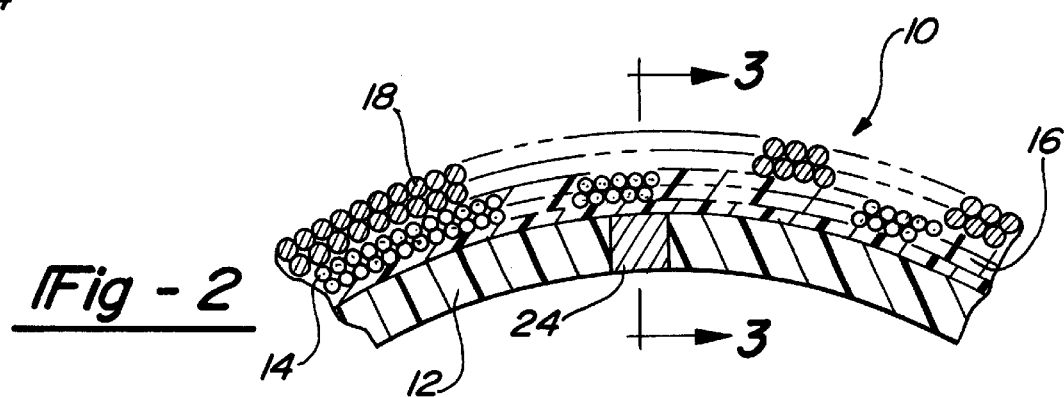
FIG. 2 is an enlarged sectional view of the hose assembly taken along line 2—2 of FIG. 1.
Figure 3:
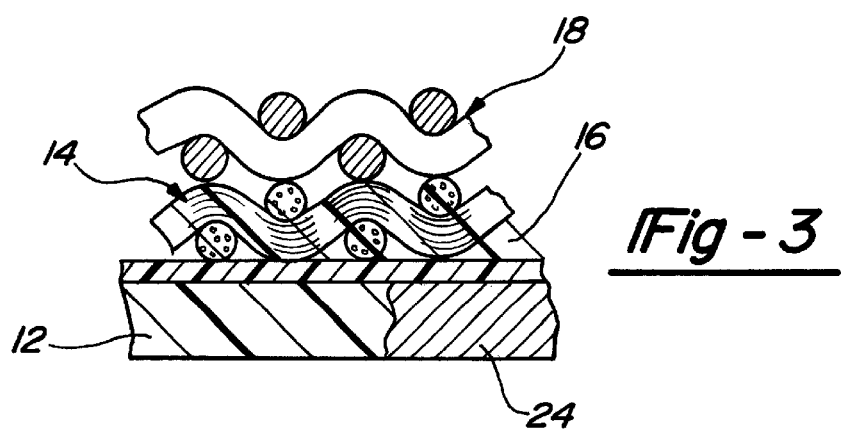
FIG. 3 is an enlarged cross-sectional view of the subject invention taken along line 3—3 of FIG. 2.

The tubular inner layer 12, as best shown in FIGS. 1 and 2, includes a polymeric fluorocarbon material resistant to both chemical and heat degradation, thus allowing a variety of fluids, particularly corrosive materials such as halogenated fluids, to pass through the inner liner 12 without corroding or degradating the inner liner 12 and reduce effusion from within the inner liner 12 to the exterior of the hose assembly 10. The inner liner 12 is preferably extruded using well known melt or paste extrusion techniques and has a wall thickness between 0.001 and 0.120 inches. Although the inner liner 12 may be made of any number of polymeric fluorocarbon materials, the inner liner 12 is ideally made from a polymer of the following:

polytetrafluoroethylene (PTFE), the homopolymer of tetrafluoroethylene sold under the trademark TEFLON® by DuPont, perfluorinated ethylene-propylene (FEP), copolymer of tetrafluoroethylene and hexafluoropropylene sold under the trademark TEFLON® FEP by DuPont, perfluoroalkoxy fluorocarbon resins (PFA), the copolymer of tetrafluoroethylene-perfluorovinyl ether sold under the trademark TEFLON® PFA by DuPont, or ethylene tetrafluoroethylene (ETFE), the copolymer of ethylene and tetrafluoroethylene sold under the trademark TEFZEL by DuPont. In addition to the aforementioned polymeric fluorocarbon materials, polychlorotrifluoroethylene, the homopolymer of chlorotrifluoroethylene, and polychlorotrifluoroethylene-ethylene, the copolymer of chlorotrifluoroethylene and ethylene may also be used.

The liner 12 is extruded to provide an inner liner 12 which has a smooth bore, free of undulations and seams which can cause turbulence of fluid flow within the inner liner 12. Turbulence can cause build-up of electrical charge within the hose assembly which is undesirable in the situation where potentially flammable fluids are being transported therethrough. Extruding the inner liner 12 creates an inner liner 12 which as no seams, holes, and undulations and is, therefore, the preferred method for forming the inner liner 12. Furthermore, an extruded inner liner 12 greatly reduces the effusion of molecules from the inner liner 12 to the exterior of the hose assembly 10. Because and extruded inner liner 12 has uniform wall thickness and lacks any seams or holes, the localized sites for effusion or inner liner failure described above for typical prior art hose assemblies are eliminated. That is, by extruding the inner liner 12, the hose assembly 10 according to the present invention eliminates the sources of hose failure and leakage associated with prior art hose assemblies used for the purposes of transporting corrosive or hazardous materials therethrough.

The assembly 10 further includes an intermediate reinforcing layer 14, having gaps extending therethrough. Generally, the reinforcing layer 14 is constructed of a braided or woven material. The reinforcing layer 14 can comprise any non-metallic material disposed in interweaving fashion or wrapped tightly about the inner liner 12. The structure of the material which includes the intermediate reinforcing layer 14 is generally a braid or weave of interlocking fibers which create gaps or interstitial spaces which facilitate the connection of reinforcing layer 14 to the inner liner 12. Preferably, the material used for the reinforcing layer 14 is glass fiber such as fiberglass. Glass fibers provide the necessary strength needed to reinforce the inner liner 12 and glass fibers are also heat resistant which is important for use in high temperature environments.

In a preferred embodiment, the glass fibers are tightly woven such that the gaps and spaces between the adjacent fibers are minimal. Braiding at neutral braid angles is common in the industry. The Braid not only aids in maintaining the shape of the assembly, but also aids in increasing the bend radius and working pressure of the system. Further, the reinforcing layer 14 adds tensile strength to the hose assembly 10. Additionally, braided reinforcing layer 14 imparts increased hoop strength to the hose assembly 10.

The reinforcing layer 14 is preferably applied about the exterior of the inner liner 12 by utilizing a braiding machine well known in the art. The machine includes a plurality of spools which carry the fiber material. The fibers are fed through the machine to a braiding area. In the braiding area, the fibers are braided or wound about the inner liner 12 to form the braided reinforcing layer 14. Alternatively, the braided reinforcing layer 14 also may be constructed in a pre-made sock-like fashion and then applied about the exterior of the inner liner 12.

Due to the chemical inertness and general lubricous nature of polymeric fluorocarbon materials, relative movement between inner and outer concentric polymeric fluorocarbon liners is often encountered in prior art hose assemblies. This relative movement can lead to weakness in the final hose assembly. The present hose assembly 10 is modified to eliminate such relative movement between the inner liner 12 and the braided reinforcing layer 14.

The assembly 10 further includes an organic polymeric dispersion or coating 16 dispersed throughout the braided layer 14. Specifically, an organic polymeric material is dispersed throughout the braided layer 14 and is located from the outer periphery of the braided reinforcing layer 14 radially inwardly toward the inner liner 12 as best shown in FIG. 2. That is, the coating 16 is distributed in the interstitial spaces created by the weaving or braiding of the individual fibers to form the reinforcing layer 14 and thereby forms a single layer therewith.

Preferably, the coating 16 includes a fluorocarbon polymer material and is selected from the following materials: the polymer of tetrafluoroethylene (PTFE), the polymer of fluorinated ethylene propropylene (FEP), the polymer of perfluoroalkoxy resins, or the polymer of ethylene tetrafluoroethylene (ETFE).

Due to the properties of the fluorocarbon polymer material, the coating 16 provides the hose assembly 10 with the necessary resistance to both heat and chemical degradation while also bonding the braided reinforcing layer 14 to the inner liner 12. That is, the fluorocarbon polymer material coats the outside of the inner liner 12 and permeates or is dispersed throughout the braided reinforcing layer 14 thereby chemically bonding the braided reinforcing layer 14 to the inner liner 12. The materials which comprise the inner liner 12 and the coating 16 are able to form a covalent bond when combined in a molten form and then subsequently allowed to cool.

The intermediate coating 16 is formed by applying the organic polymeric material about the inner liner 12 prior to braiding or weaving of the glass fibers about the inner liner 12 as described above. Preferably, the organic polymeric material includes a dispersion containing the fluorocarbon material and a carrying agent (i.e., a solvent). Additionally, a surfactant may also be used in the dispersion to allow the fluorocarbon material to more evenly flow and spread about the surface of the inner liner 12. That is, because of the inherent nature of fluorocarbon polymer materials, that primarily being their non-reactivity, the surfactant lowers surface tension allowing the fluorocarbon polymer material in the dispersion be more evenly distributed over the surface of the inner liner 12. Preferably, the dispersion includes between about 10% to 90% solid fluorocarbon polymer material (in fine granules or in particulate form), or the remainder being solvent. The carrying agent carries the solid fluorocarbon material and disperses the material onto the inner liner 12. The preferred carrying agent is water, but other suitable carrying agents may be used. If a surfactant is used, it is preferably used in amounts between about 1% to about 10% of the total weight of the dispersion. Any suitable surfactant can be used, such as FLUORAD FLUORO-CHEMICAL FC 171 (liquid) and FLUORAD FLUORO-CHEMICAL FC 143 (power case) sold by the 3M Corporation, and SILWETT 77 sold by Union Carbide have been found to work especially well.

Once the dispersion is applied about the inner liner 12, the braided reinforcing layer 14 is then disposed about the inner liner 12 having the dispersion thereon. Using braided material, the braiding is done in such a manner that the braiding operation forces the dispersion into the interstitial spaces of the braided layer 14 and about the exterior of all of the glass fibers including the braided reinforcing layer 14. That is, enough dispersion is applied about the inner liner 12 so as to coat the entire braided reinforcing layer 14 as the braided reinforcing layer 14 is applied about the exterior of the inner liner 12 having the dispersion thereon. In this manner, the outer periphery of each individual fiber is completely coated. In addition, a second dispersion containing the same fluorocarbon polymer material, carrying agent and surfactant can be applied over the braided reinforcing layer 14 so as to provide a more definite coating of the fibers including the braided reinforcing layer 14. That is, the second dispersion is applied to insure that a complete bond is formed between the braided reinforcing layer 14 and the inner liner 12. By utilizing two distinct dispersion steps, Applicant has found that voids or gaps in the intermediate coating 16 which bonds the reinforcing layer 14 to the inner liner 12 are virtually eliminated. By eliminating these voids or gaps in the intermediate coating 16, a more positive bond is achieved between the reinforcing layer 14 and the inner liner 12 thereby reducing the likelihood that the reinforcing layer 14 will delaminate from the inner liner 12 thereby causing the potential for the hose assembly 10 to kink or fail at that location.

Enough dispersion is applied about the inner liner 12 and over the reinforcing layer 14 so as to coat the entire braided layer 14. In this manner, the outer periphery of each individual fiber is completely coated. The carrying agent and the surfactant, if used, are then removed from the dispersion by drying (heating) the hose assembly 10 thereby leaving the fluorocarbon polymer material dispersed throughout the entirety of the braided layer 14. The hose assembly 10 is then subsequently sintered to cure the fluorocarbon polymer material dispersed throughout the braided reinforcing layer 14 into the intermediate coating 16. The sintering operation fuses the fluorocarbon polymer material of the dispersion to both the braided reinforcing layer 14 and the fluorocarbon polymer material including the inner liner 12.

As previously stated, both the inner liner 12 and the intermediate coating 16 are preferably fluorocarbon polymers. It is not necessary that both the inner liner 12 and the intermediate coatings 16 be of the same fluorocarbon polymer, although they may be. For example, the inner liner 12 may be made of PFA while the coating 16 is made of PTFE. Any combination of fluorocarbon polymers can be utilized for the inner liner 12 and the coating 16. By utilizing similar fluorocarbon polymers, a strong bond between the inner liner 12 and the coating 16 can be achieved. Furthermore, by coating the inner liner 12 prior to braiding the reinforcing layer 14 about the inner liner 12 and by also coating the braided layer 14 subsequent to its disposal about the inner liner 12, it is insured that a sufficient amount of polymer will be retained between the braided reinforcing layer 14 and the inner liner 12 to form an acceptable bond therebetween.

The intermediate coating 16 acts as an adhesive or co-adhesive to bond the braided reinforcing 14 to the inner liner 12, thus, prohibiting slippage, i.e., relative longitudinal or rotary movement between the inner liner 12 and the braided reinforcing layer 14. That is, the coating 16, dispersed throughout the braided reinforcing layer provides strength to the inner liner 12 upon bending of the hose assembly 10. Thus, by using a polymeric fluorocarbon coating 16 dispersed throughout the braided reinforcing layer 14, a hose assembly 10 is produced which results in hoop strength of the inner liner 12 being increased so that the inner liner 12 can be bent without kinking. Further, the intermediate coating 16 allows the hose assembly 10 to operate at higher working pressures. That is, the coating 16 provides strength to the inner liner 12 and allows the inner liner 12 to accommodate fluids to be transported under greater pressure.

The polymeric fluorocarbon braided outer liner 18, as best shown in FIGS. 1 and 2, is disposed about the braided reinforcing layer 14 and the coating 16. The polymeric fluorocarbon braided layer 18 includes a fluoropolymer material for increasing the strength and flexibility of the hose assembly 10. More specifically, the fluoropolymer outer layer 18 allows the inner liner 12 to be bent to small radii without kinking. That is, the outer fluoropolymer layer 18 provides strength to the inner liner 12 upon bending. This is commonly referred to as hoop strength. Thus, by disposing the outer fluoropolymer layer 18 about the braided reinforcing layer 14 and the inner liner 12, the hoop strength of the inner liner 12 is increased, thus improving the bend radius of the hose assembly 10. Improvement in the bend radius allows the hose assembly 10 to be manipulated or placed into configurations which would impinge or kink the inner liners of prior art hose assemblies. In other words, the fluoropolymer outer layer 18 allows for a reduction in static and dynamic bend radius of the hose assembly 10 thereby allowing the hose assembly 10 to be utilized in a greater number of applications. Additionally, the fluoropolymer outer layer 18 adds to the burst strength of the hose assembly. In other words, the fluoropolymer outer layer 18 allows the hose assembly 10 to be used in applications where the hose assembly 10 is operated at much higher operating pressures without bursting of the hose assembly 10. Furthermore, the fluoropolymer outer layer 18 provides for more positive fixation of couplings or end fittings 20 to the hose assembly 10 as shown in FIG. 1. The fluoropolymer outer layer 18 increases the tensile strength that the hose assembly 10 sufficiently to fixedly connect the coupling member 20 (FIG. 1) to the hose assembly 10.

In a preferred embodiment of the hose assembly 10 as shown in FIGS. 1 and 2, the fluoropolymer outer layer 18 can include two separate braided layers of the fluoropolymer material. However, the hose assembly 10 can be constructed utilizing only one fluoropolymer layer 18 (not shown) disposed about the reinforcing layer 14 and intermediate coating 16.

In addition to increasing the flexibility and strength of the hose assembly 10, the outer fluoropolymer layer 18 is resistant to chemical degradation due to spillage and effusion of the contents of the inner liner 12 pooling on the outer layer 18. As is the case for the polymeric fluoropolymer material of which the inner liner 12 is constructed, the chemical inertness of the polymeric fluorocarbon material of which the outer layer 18 is constructed allows the outer layer 18 to be resistant to chemical degradation. By utilizing a material, such as a fluorocarbon polymer, which is essentially chemically inert, hose failure and premature degradation are reduced.

The braided fluoropolymer outer layer (or layers) 18 also allow for the evaporation of any spillage or effluent which may come into contact with the exterior of the hose assembly 10. In other words, the braided construction of the outer layer 18 allows for greater exchange between any liquid spillage or effluent with the atmosphere thereby promoting evaporation. By promoting evaporation, the life of the hose assembly can be extended as the spillage or effluent is not allowed to remain in contact for extended periods of time.

The outer braided fluoropolymer layer 18 can be made of any suitable fluoropolymer material. In the preferred embodiment of the hose assembly 10, the outer layer 18 is made from polyvinylidene fluoride (PVDF) and sold under the name Kynar®. Various other nylons and related polymers can be used. The fluoropolymer outer layer 18 is preferably braided in place over the first braided reinforcing layer 14 and the intermediate fluorocarbon coating 16. The fluoropolymer braided outer layer 18 is preferably applied about the exterior of the intermediate coating 16 by utilizing a braiding machine well known in the art. The machine includes a plurality of spools which carry appropriately sized fluoropolymer material. The fluoropolymer material is fed through the machine to a braiding area. In the braiding area, the fluoropolymer material is braided or wound about the exterior of the coating 16 and the first braided reinforcing layer 14. Alternatively, the fluoropolymer braided layer 18 also may be constructed in its entirety in a sock-like fashion and then applied about the exterior of the first braided reinforcing layer 14 and the intermediate coating 16. Unlike the braided reinforcing layer 14, the braided fluoropolymer outer layer 18 is not bonded to any of the underlying structure. That is, the braided fluoropolymer outer layer 18 is not affixed to the underlying hose assembly.

As fluid flows through the inner liner 12, electrical charges tend to build up throughout the length of the inner liner 12. In order to prevent these electrical charges from accumulating, the inner liner 12 can include an integral longitudinal conductive means 24 co-extensive with the length of the inner liner 12 for conducting an electrical charge along the length of the inner liner 12. Preferably the integral conductor 24 includes a conductive strip 24 of carbon black, as shown in FIGS. 1 and 2. Alternatively, the integral conductor 24 can comprise an inner layer (not shown) of carbon black positioned adjacent and inner surface of the inner liner 12. Alternatively, the integral conductor 24 can be interspersed throughout the inner liner 12 by intermixing carbon black throughout the polymeric fluorocarbon material while the inner liner 12 is extruded (not shown).

The hose assembly 10 further includes a coupling 20 as shown in FIG. 1. The coupling 20 is adapted to engage the ends of the hose assembly 10 for interconnecting the hose assembly 10 to a flow of fluid, e.g., fuel flow to and from a fuel tank (not shown). Couplings suitable for use with the hose assembly 10 of the present invention are well known in the art. Typically, the couplings 24 are adapted to engage the ends of the hose assembly 10. The couplings are adapted by way of an insert portion (not shown) which engages the inner surface of the inner liner 12.

The insert portion can have a plurality of barbs (not shown) for engaging the inner surface of the inner liner 12. The coupling 24 can also include an engaging portion (not shown) extending longitudinally from the insert portion for engaging a fitting (not shown). The engaging portion may comprise a male threaded member 28 or female threaded member (not shown). The engaging portion can comprise any configuration that will cooperate with the member to which it is connected with. For example, the engaging portion can comprise a socket to receive a mating ball joint (not shown).

Alternatively, in place of the engaging portion, the coupling 24 can provide an additional insert portion (not shown)

for inserting into an engaging the interior surface of the inner liner 12. The coupling 24 is preferably made from a metallic material or an organic polymeric material and is mechanically connected to the hose assembly 10, as shown in FIG. 1. Alternatively, the coupling 24 can be molded to the hose assembly (not shown). Additionally, the coupling 24 can be any other well known type of the coupling known to those skilled in the art.

The preferred method for making the hose assembly 10 as shown in the Figures is as follows. The inner organic polymeric liner 12 is provided. Specifically, the inner liner 12 is extruded in a well known manner from a fluorocarbon polymer. The inner liner 12 is extruded preferably having a smooth bore and seamless structure. Additionally, if a conductor is to be included in the hose assembly 10, the conductor 24 can be simultaneously extruded into the inner liner 12. The inner liner 12 is passed through a reservoir containing an aqueous dispersion of the fluorocarbon polymer material.

Alternatively, the dispersion may be sprayed onto the inner liner 12 or may be brushed onto the inner liner 12. If no surfactant is contained in the dispersion material and it is desired that a surfactant be used, it can be applied to the assembly by dipping the assembly into a reservoir containing the surfactant or spraying the surfactant directly thereon. Preferably, the surfactant would be applied to the inner liner 12 prior to applying the polymeric fluorocarbon dispersion to the inner liner 12. That is, regardless of whether the dispersion contains the surfactant therein, surfactant may be applied to the hose assembly 10 prior to the application of the dispersion thereto.

As was previously stated, the reservoir containing the dispersion can comprise a chamber having the solution therein, or the reservoir can comprise brushes having the dispersion thereon. The brushes are in continuous engagement with the inner liner 12 to coat the inner liner 12.

Preferably, the dispersion is an aqueous dispersion including the fluorocarbon polymer material therein. Because the dispersion is preferably aqueous, the preferred carrying agent is water. The dispersion is applied about the entire inner liner 12. The braided material is then applied about the exterior of the inner liner 12 having the dispersion thereon by braiding, weaving, or wrapping the fibers about the inner liner 12. Alternatively, the fibers may be braided to form a sock-like construction into which the inner liner 12 is placed. The braided material is applied by such that the dispersion is dispersed throughout the interstitial spaces of the braided reinforcing layer 14. That is, by wrapping the braided material about the inner liner 12, some of the dispersion is forced into the interstitial spaces at about the exterior of the fibers including the reinforcing layer 14.

After the braiding is completed, the inner liner 12 including the fluorocarbon polymer dispersion and the braided reinforcing layer 14 thereon, the assembly can be passed for a second time through a reservoir containing the aqueous dispersion of the fluorocarbon polymer material. Alternatively, the dispersion can be sprayed onto the inner liner 12 or may be brushed onto the inner liner 12. If no surfactant is contained in the dispersion material, and it is desired that a surfactant be used, it can be applied to the assembly by dipping the assembly into a reservoir containing the surfactant or spraying the surfactant directly thereon. Preferably, the surfactant would be applied to the braided reinforcing layer 14 prior to the application of the polymeric fluorocarbon dispersion to the braided reinforcing layer 14. That is, regardless of whether the dispersion contains the surfactant therein, surfactant can be applied to the hose assembly 10 prior to applying the dispersion thereto.

After the braiding is completed or after the dispersion is applied over the braided reinforcing layer 14, the carrying agent and surfactant (if any) are removed from the dispersion. Specifically, the hose assembly 10 is passed through a dryer (a preheated oven) which is preferably below the boiling temperature of the carrying agent (e.g., for water: 212° F.). By utilizing an oven at a temperature below the boiling temperature of a carrying agent, a bubbling effect is avoided in the final product thereby providing a hose assembly which is free from surface defects. The temperature can be above the boiling temperature, however, the hose assembly 10 may contain many bubbles in the coating 16 if higher drying temperatures are used. Subsequently, the surfactant (if used) is removed from the dispersion by heating the hose assembly 10 as discussed above. Generally, higher temperatures are required to remove the surfactant then those required to remove the carrying agent, i.e., usually 450° to 575° F. Thus, once the carrying agent and the surfactant (if any) are removed from the dispersion, the fluorocarbon material is left dispersed throughout the entirety of the braided reinforcing layer 14 and about the inner liner 12. The hose assembly 10 is then sintered at a suitable temperature (roughly 700° F.) to cure the fluorocarbon material into the coating 16. That is, the particular fluorocarbon polymer material is fused at the elevated temperatures to form a continuous coating 16. Because glass fibers are used for the braided layer 14, they are unaffected by the temperatures required to sintered the fluorocarbon polymers of the inner liner 12 and the dispersion including the coating 20. Following the sintering step, the outer braided fluoropolymer layer 18 is applied as described above.

Throughout this application various publications are referenced by citation or number. Full citations for the publication are listed below. The disclosure of these publications in their entireties are hereby incorporated by reference into this application in order to more fully describe the state of the art to which this invention pertains.

The invention has been described in an illustrative manner, and it is to be understood the terminology used is intended to be in the nature of description rather than of limitation.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

What is claimed is:

1. A hose assembly (10) consisting of:
    an extruded, smooth bore tubular inner liner (12) comprising a polymeric fluorocarbon material, a reinforcing layer (14) having gaps extending therethrough disposed about said inner liner (12), an intermediate coating (16) including an fluorocarbon polymeric material for strengthening and connecting said reinforcing layer (14) to said inner liner (12), and characterized by at least one braided outer layer (18) disposed about and continuously in contact with said reinforcing layer (14) resistant to chemical degradation and for increasing the strength and bending properties of said hose assembly (10) and thereby providing a hose assembly (10) which reduces effusion of molecules therethrough.

2. An assembly (10) as set forth in claim 1 further characterized by including two braided outer layers (18).

3. An assembly (10) as set forth in claim 1 further characterized by said fluorocarbon polymeric material of said intermediate coating (16) dispersed in said reinforcing layer (14) being the same material as said tubular inner liner (12).

4. An assembly (10) as set forth in claim 3 further characterized by said reinforcing layer (14) having an outer periphery, said intermediate coating (16) extending from the outer periphery of said reinforcing layer (14) radially inwardly toward said inner liner (12).

5. An assembly (10) as set forth in claim 1 further characterized by said reinforcing layer (14) including a tightly wound non-metallic material.

6. An assembly (10) as set forth in claim 5 further characterized by said non-metallic material including glass fiber.

7. An assembly (10) as set forth in claim 1 further characterized by said braided outer layer (18) including a fluoropolymer material.

8. An assembly (10) as set forth in claim 7 further characterized by said fluoropolymer material including polyvinylidene fluoride.

9. An assembly (10) as set forth in claim 1 further characterized by said polymeric fluorocarbon material including polytetrafluoroethylene.

10. An assembly (10) as set forth in claim 1 further characterized by said polymeric fluorocarbon material including perfluorinated ethylene-propylene.

11. An assembly (10) as set forth in claim 1 further characterized by said fluorocarbon polymer including perfluoralkoxy.

12. An assembly (10) as set forth in claim 1 further characterized by said polymeric fluorocarbon material including polyfluoroethylene.

13. An assembly (10) as set forth in claim 1 further characterized by said polymeric fluorocarbon material including perfluoralkoxy fluorocarbon resin.

14. An assembly (10) as set forth in claim 1 further characterized by said polymeric fluorocarbon material including ethylenetetrafluoroethylene.

15. An assembly (10) as set forth in claim 1 further characterized by said inner liner including an integral conductive means (24) coextensive with the length of said inner liner (12) for conducting electrical charges along the length of said inner liner (12).

16. An assembly (10) as set forth in claim 15 further characterized by said integral conductive means (24) including carbon black.

17. An assembly as set forth in claim 1 further characterized by including coupling means (20) adapted to engage the ends of said hose assembly (10) for interconnecting said hose assembly (10) to a flow of fluid.

18. A method for constructing a hose assembly (10), said method consisting of the steps of:

extruding a smooth bore tubular inner liner (12) comprising a fluorocarbon polymeric material;

applying a first dispersion comprising a fluorocarbon polymer material and a carrier fluid over the smooth bore tubular inner liner (12);

disposing a first braided reinforcing layer (14) about the smooth bore tubular inner liner (12) and over the first applied dispersion; and disposing at least one braided outer layer (18) about the first braided reinforcing layer (14).

19. A method as set forth in claim 18 further including the step of applying a second dispersion comprising a fluorocarbon polymer material and a carrier fluid over the reinforcing layer (14) to chemically bond the reinforcing layer (14) to the tubular inner liner (12) and the first applied dispersion.

20. A method as set forth in claim 18, wherein the outer braided layer (18) includes a fluoropolymer material.

21. A method as set forth in claim 18, wherein the fluoropolymer material is polyvinylidene fluoride.

22. A method as set forth in claim 18, wherein said first dispersion step is further defined by passing the tubular inner liner (12) through a reservoir containing the dispersion of the fluorocarbon polymer material.

23. A method as set forth in claim 22, wherein said second dispersion step is further defined by passing the tubular inner liner (12) having the first dispersion and the first braided reinforcing layer (14) thereon through a reservoir containing the dispersion of the fluorocarbon polymer material.

24. A method as set forth in claim 18, wherein the first dispersion and the second dispersion further including the step of removing the carrier fluid from the dispersed fluorocarbon material throughout the first braided layer (14) to leave an intermediate single coating (16) of the fluorocarbon material dispersed therethrough.

25. A method as set forth in claim 18 further including the step of sintering the hose assembly (10).

26. A method as set forth in claim 25, wherein said sintering step occurs prior to disposing of the outer braided layer (18) about the hose assembly (10).

27. A method as set forth in claim 18 further including the step of securing at least one end fitting (20) to the hose assembly (10).

* * * * *